US012221228B2

(12) United States Patent
Mojtahedzadeh et al.

(10) Patent No.: US 12,221,228 B2
(45) Date of Patent: Feb. 11, 2025

(54) COMPONENT RECORD PROCESSING FOR AIRCRAFT MAINTENANCE

(71) Applicant: The Boeing Company, Chicago, IL (US)

(72) Inventors: Mohammad T. Mojtahedzadeh, Maple Valley, WA (US); Robert Anthony Bernicchi, Bellevue, WA (US); Emily Samuelson, Seattle, WA (US); Shervin Beygi, Seattle, WA (US)

(73) Assignee: The Boeing Company, Arlington, VA (US)

( * ) Notice: Subject to any disclaimer, the term of this patent is extended or adjusted under 35 U.S.C. 154(b) by 620 days.

(21) Appl. No.: 17/445,927

(22) Filed: Aug. 25, 2021

(65) Prior Publication Data
US 2023/0061096 A1 Mar. 2, 2023

(51) Int. Cl.
B64F 5/40 (2017.01)
B64F 5/60 (2017.01)
G06F 40/40 (2020.01)
G06N 3/08 (2023.01)

(52) U.S. Cl.
CPC .................. B64F 5/40 (2017.01); B64F 5/60 (2017.01); G06F 40/40 (2020.01); G06N 3/08 (2013.01)

(58) Field of Classification Search
CPC ... B64F 5/40; B64F 5/60; G06F 40/40; G06N 3/08
See application file for complete search history.

(56) References Cited

U.S. PATENT DOCUMENTS

| 6,606,546 B2 * | 8/2003 | Sinex ................. G06Q 10/0875 701/32.7 |
| 6,813,777 B1 * | 11/2004 | Weinberger ........ H04N 21/2146 348/E7.071 |
| 7,702,436 B2 * | 4/2010 | Wingenter ............ G01M 17/00 702/182 |
| 8,117,007 B2 | 2/2012 | Yitbarek et al. |

(Continued)

OTHER PUBLICATIONS

European Patent Office, Extended European Search Report Issued in Application No. 22165099.7, Sep. 21, 2022, Germany, 9 pages.

(Continued)

Primary Examiner — Luis A Martinez Borrero
(74) Attorney, Agent, or Firm — Alleman Hall & Tuttle LLP

(57) ABSTRACT

A method for aircraft maintenance comprises loading, into computer memory, a plurality of unstructured aircraft component records originating from one or more different component status monitors, the plurality of unstructured aircraft component records describing observed maintenance conditions of a plurality of different aircraft components. The plurality of unstructured aircraft component records are provided from computer memory to a natural language processing (NLP) model configured to output a corresponding plurality of digital component, condition, and location (CCL) records for the plurality of different aircraft components. CCL records for a plurality of different CCL types are independently computer aggregated. The CCL records for a selected CCL type are computer aggregated to determine a time-dependent failure distribution for the selected CCL type.

25 Claims, 8 Drawing Sheets

(56) References Cited

U.S. PATENT DOCUMENTS

| | | | |
|---|---|---|---|
| 8,401,729 B2* | 3/2013 | Rouyre | B64F 5/60 701/32.7 |
| 9,522,745 B2* | 12/2016 | Mahalingaiah | G07C 5/0841 |
| 9,886,478 B2* | 2/2018 | Mukherjee | G10L 15/26 |
| 10,457,423 B2* | 10/2019 | Lu | G06Q 10/06 |
| 10,676,048 B2* | 6/2020 | Dixit | G05B 23/0278 |
| 10,964,130 B1* | 3/2021 | Dixit | G05B 23/0283 |
| 11,842,584 B1* | 12/2023 | List | B64F 5/60 |
| 2006/0064291 A1* | 3/2006 | Pattipatti | G05B 23/0251 703/14 |
| 2007/0114280 A1* | 5/2007 | Coop | G06Q 10/08 340/572.1 |
| 2009/0240390 A1* | 9/2009 | Nenadic | G05B 23/0251 701/29.1 |
| 2010/0082702 A1* | 4/2010 | Ramanathan | G07C 5/008 707/E17.005 |
| 2010/0161169 A1* | 6/2010 | Ramanathan | G07C 5/008 701/31.4 |
| 2011/0257839 A1* | 10/2011 | Mukherjee | G06F 16/243 701/33.4 |
| 2012/0198220 A1* | 8/2012 | Felke | G05B 23/0213 713/2 |
| 2012/0304164 A1* | 11/2012 | van der Zweep | G05B 23/0213 717/174 |
| 2013/0097459 A1* | 4/2013 | Bell | G05B 23/0213 714/E11.029 |
| 2013/0179028 A1* | 7/2013 | Gu | G06F 17/00 701/29.4 |
| 2014/0013002 A1* | 1/2014 | Holstein | H04B 7/18508 709/231 |
| 2014/0067694 A1* | 3/2014 | Moos | G06Q 10/20 705/305 |
| 2015/0019065 A1* | 1/2015 | Bollapragada | B64F 5/40 701/29.1 |
| 2015/0254908 A1* | 9/2015 | Rodrigues | G07C 5/0808 701/31.9 |
| 2016/0083118 A1* | 3/2016 | Mahalingaiah | G07C 5/008 701/32.1 |
| 2016/0236800 A1* | 8/2016 | Kavalkovich | G06Q 10/20 |
| 2017/0166328 A1* | 6/2017 | Ethington | G06Q 10/20 |
| 2017/0233105 A1* | 8/2017 | Vali | B64F 5/40 701/3 |
| 2017/0369190 A1* | 12/2017 | Ethington | B64F 5/60 |
| 2018/0137766 A1* | 5/2018 | Bostick | G06Q 50/40 |
| 2018/0346151 A1* | 12/2018 | Sturlaugson | G06N 20/20 |
| 2018/0362190 A1* | 12/2018 | Chambers | B64F 5/60 |
| 2019/0026964 A1* | 1/2019 | Papa | G06V 30/40 |
| 2019/0092495 A1* | 3/2019 | Lu | G07C 5/0816 |
| 2020/0122656 A1* | 4/2020 | Dixit | G05B 23/0283 |
| 2020/0160280 A1 | 5/2020 | Mojtahedzadeh et al. | |
| 2020/0210968 A1 | 7/2020 | Mojtahedzadeh et al. | |
| 2021/0082292 A1* | 3/2021 | Sindhwani | G08G 5/0056 |
| 2021/0097058 A1* | 4/2021 | Skiles | B64F 5/40 |
| 2021/0277906 A1* | 9/2021 | Megchiani | F04D 15/0088 |
| 2021/0335059 A1* | 10/2021 | Dixit | G05B 23/0254 |
| 2022/0027762 A1* | 1/2022 | Leitch | G06N 5/04 |
| 2022/0402630 A1* | 12/2022 | Warren | B64C 13/04 |
| 2023/0146900 A1* | 5/2023 | Bushkov, Jr. | G06F 40/30 701/3 |

OTHER PUBLICATIONS

Guo, J. et al., "Reliability Centered Preventive Maintenance Optimization for Aircraft Indicators," Proceedings of the 2016 Annual Reliability and Maintainability Symposium, Jan. 25, 2016, Tucson, Arizona, 6 pages.

Rodrigues, R. et al., "Aircraft interior failure pattern recognition utilizing text mining and neural networks," Journal of Intelligent Information Systems, vol. 38, Sep. 1, 2011, 26 pages.

* cited by examiner

COMPONENT RECORD PROCESSING FOR AIRCRAFT MAINTENANCE

FIELD

The invention relates generally to aircraft maintenance, and more specifically, to analyzing and aggregating records describing maintenance conditions of components of the aircraft.

BACKGROUND

Passenger aircraft include a wide variety of different components, including many that are visible to and/or used by human passengers and crew on-board the aircraft. The appearance and/or functionality of such components can degrade over time due to various reasons—e.g., wear-and-tear, damage caused by passengers, or design defects. Exposure to damaged or nonfunctional aircraft components can negatively affect a passenger's perception of an aircraft and/or airline that operates the aircraft.

Furthermore, the available information pertaining to the current maintenance status (e.g., operational, damaged, or broken) of different components on the aircraft is often scattered and unstructured. For example, different human personnel and/or automated systems often record problems with aircraft components in different ways, at different times, and in different places. This can complicate attempts to service and maintain components of the aircraft in a manner that reduces disruption to aircraft operation (e.g., via service interruptions necessitated by unscheduled maintenance), and also reduces passenger exposure to worn, damaged, or broken aircraft components.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

To address at least the above issues, according to one aspect of the subject disclosure, a method for aircraft maintenance is provided. The method comprises loading, into computer memory, a plurality of unstructured aircraft component records originating from one or more different component status monitors, the plurality of unstructured aircraft component records describing observed maintenance conditions of a plurality of different aircraft components. The plurality of unstructured aircraft component records are provided from computer memory to a natural language processing (NLP) model configured to output a corresponding plurality of digital component, condition, and location (CCL) records for the plurality of different aircraft components. CCL records for a plurality of different CCL types are independently computer aggregated. The CCL records for a selected CCL type are computer aggregated to determine a time-dependent failure distribution for the selected CCL type.

The features, functions, and advantages that have been discussed can be achieved independently in various embodiments or can be combined in yet other embodiments, further details of which can be seen with reference to the following description and drawings.

DETAILED DESCRIPTION

Figure 1:
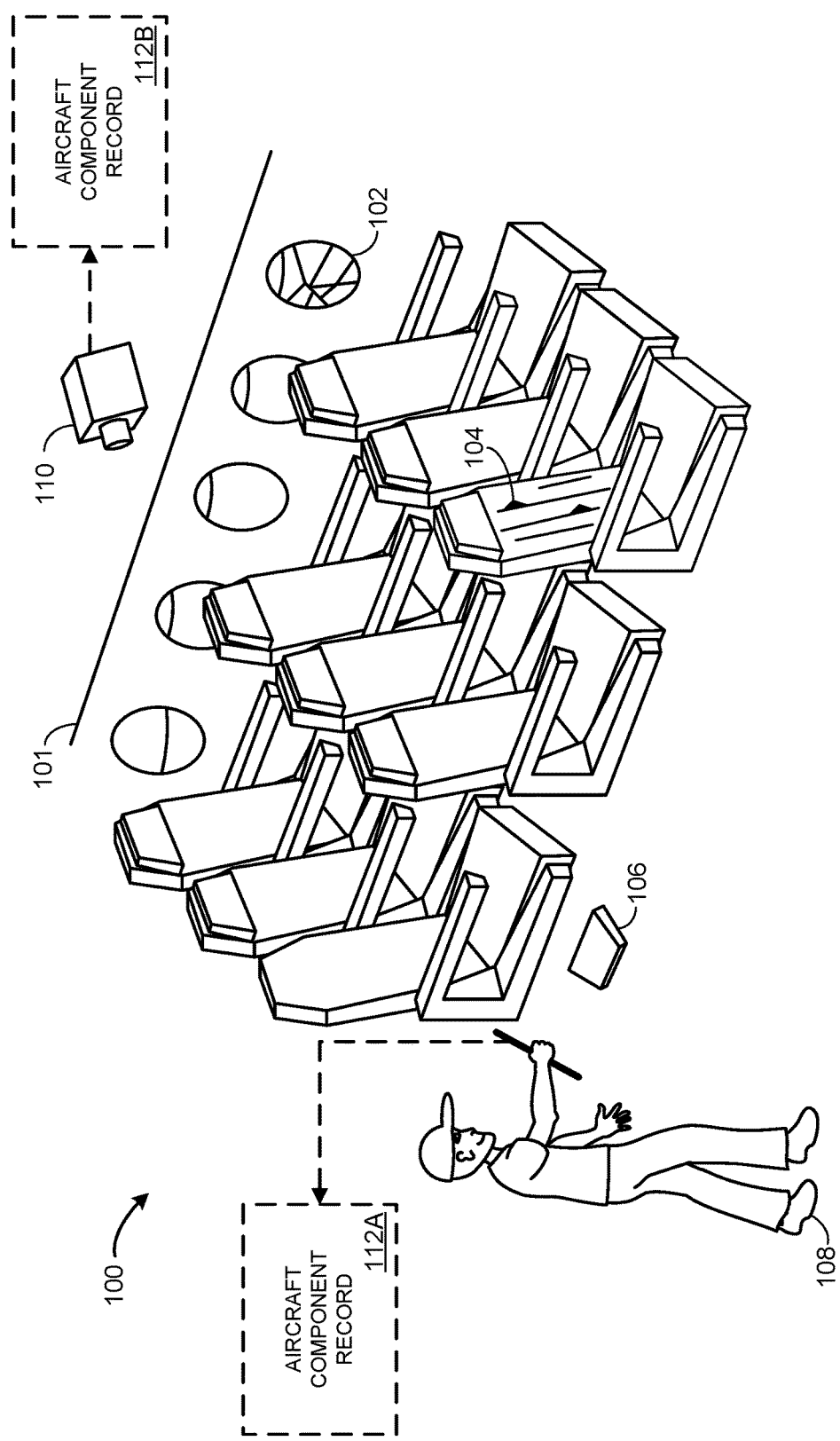
FIG. 1 schematically shows an example interior cabin of an aircraft including a plurality of different aircraft components.

FIG. 1 schematically shows an example interior cabin 100 of an aircraft 101. As shown, the interior cabin includes a plurality of different aircraft components including, as examples, seats, headrests, armrests, windows, and window shades. It will be understood that the interior cabin of an aircraft can include a wide variety of different passenger-facing and/or crew-facing aircraft components, including many types of components not shown in FIG. 1 or explicitly described herein. Furthermore, it will be understood that the techniques described herein can be applied to any component of an aircraft, and need not be specifically limited to passenger-facing or crew-facing components in an interior cabin of the aircraft. As used herein, the term "component" can refer to any part or material on an aircraft (or other vehicle or machine) and/or power plant. Further still, the techniques described herein can be applied to record processing and maintenance of other non-aircraft vehicles and non-vehicle machines.

As discussed above, the appearance and/or functionality of aircraft or other machine components can become degraded over time. In the example of FIG. 1, several aircraft components in interior cabin 100 have become degraded in this manner. Specifically, a window 102 is cracked, the fabric of a seat 104 has become worn, and a headrest 106 has been separated from its corresponding seat. Again, it will be understood that different components of an aircraft can become damaged, degraded, or broken in any number of different ways, and that the scenario depicted in FIG. 1 is only a non-limiting example. Furthermore, it will be understood that different aircraft components can exhibit different types of damage or failures having different causes—e.g., normal wear-and-tear, damage caused by passengers, or failures caused by design problems.

As will be described in more detail below, the maintenance status of various components of the aircraft (including components 102, 104, and 106) can be described by respective aircraft component records that originate from one or more different component status monitors. In the example of FIG. 1, two component status monitors are present, including human personnel 108 and on-board aircraft sensor 110. Either or both of these component status monitors can observe or detect the current maintenance condition of various aircraft components of aircraft 101 and generate corresponding aircraft component records, such as records 112A and 112B.

However, information regarding the current maintenance status of various aircraft components is often unstructured and scattered. As used herein, the term "unstructured" refers to aircraft component records that are not organized according to a pre-defined organization system or do not use a pre-defined data format or schema. For example, any number of different human personnel working for an airline, airport, aircraft manufacturer, regulatory agency, etc., can record the maintenance condition of an aircraft component in any number of different ways—such as by using freeform handwriting vs computer-typing, natural language vs Air Transport Association (ATA) codes, using different descriptive terms, using different data formats, using different subjective descriptions, or using different languages, as examples. Furthermore, such records can be stored in any number of different locations—e.g., a computer database, an aircraft logbook, a set of maintenance or modification records, or service bulletin records. Each of these potential locations may or may not be equally accessible to all entities involved in aircraft component maintenance. In one potential scenario, two different individuals (and/or automated sensors) can record the same maintenance issue for the same aircraft component in two different ways, and such component records can be stored in two different locations.

This often complicates efforts by parties involved in aircraft maintenance (e.g., airlines, aircraft manufacturers) to holistically understand the current conditions of components of an aircraft, and the frequency with which different types of issues arise. Furthermore, the scattered and unstructured nature of aircraft component records can make it difficult to service and maintain aircraft components in a manner that reduces disruption to aircraft operation, and also reduces passenger exposure to worn, damaged, or broken aircraft components. For example, based on an insufficient understanding of the rate and/or manner in which certain aircraft components are damaged, an accumulation of damaged components can necessitate unscheduled maintenance. This can lead to service interruptions and a negative customer experience.

Similarly, existing maintenance schedules can sometimes be too aggressive—e.g., aircraft can be taken out of service for scheduled maintenance even when such maintenance is not yet necessary, and/or components can be replaced preemptively. While this can mitigate or prevent passenger exposure to damaged components, it can also lead to excessive maintenance costs and inefficient aircraft operations. Furthermore, aircraft component damage is inherently a mix of distinct random processes—e.g., wear-and-tear, passenger damage, and design problems—and it can be difficult to distinguish between these processes using unstructured data, reducing the effectiveness of a maintenance program developed from such data. In general, the scattered and unstructured form that component maintenance records typically take can significantly impact the ability of an airline, aircraft owner, and/or other relevant parties to design a maintenance program that efficiently balances aircraft operation, maintenance costs, and passenger perception.

Accordingly, the subject disclosure is directed to techniques for aircraft maintenance in which a plurality of unstructured aircraft component records are provided to a natural language processing (NLP) model configured, e.g., via previous machine learning training, to output a corresponding plurality of digital structured aircraft component records. The subject disclosure primarily describes such structured records as taking the form of component, condition, and location (CCL) records, as one non-limiting example of a suitable schema for structured records. Once the CCL records are output, CCL records for a selected CCL type can be independently aggregated and computer analyzed to determine a time-dependent failure distribution from the selected CCL type. The time-dependent failure distribution can facilitate identifying and alleviating maintenance issues reflected by the CCL records—e.g., to determine a maintenance interval, facilitate part demand estimation, or facilitate a reliability analysis. In this manner, a technical effect of the techniques described herein can improve the overall efficiency of aircraft operation and maintenance by providing new insight into the current maintenance conditions of a plurality of different components of the aircraft.

Figure 2:
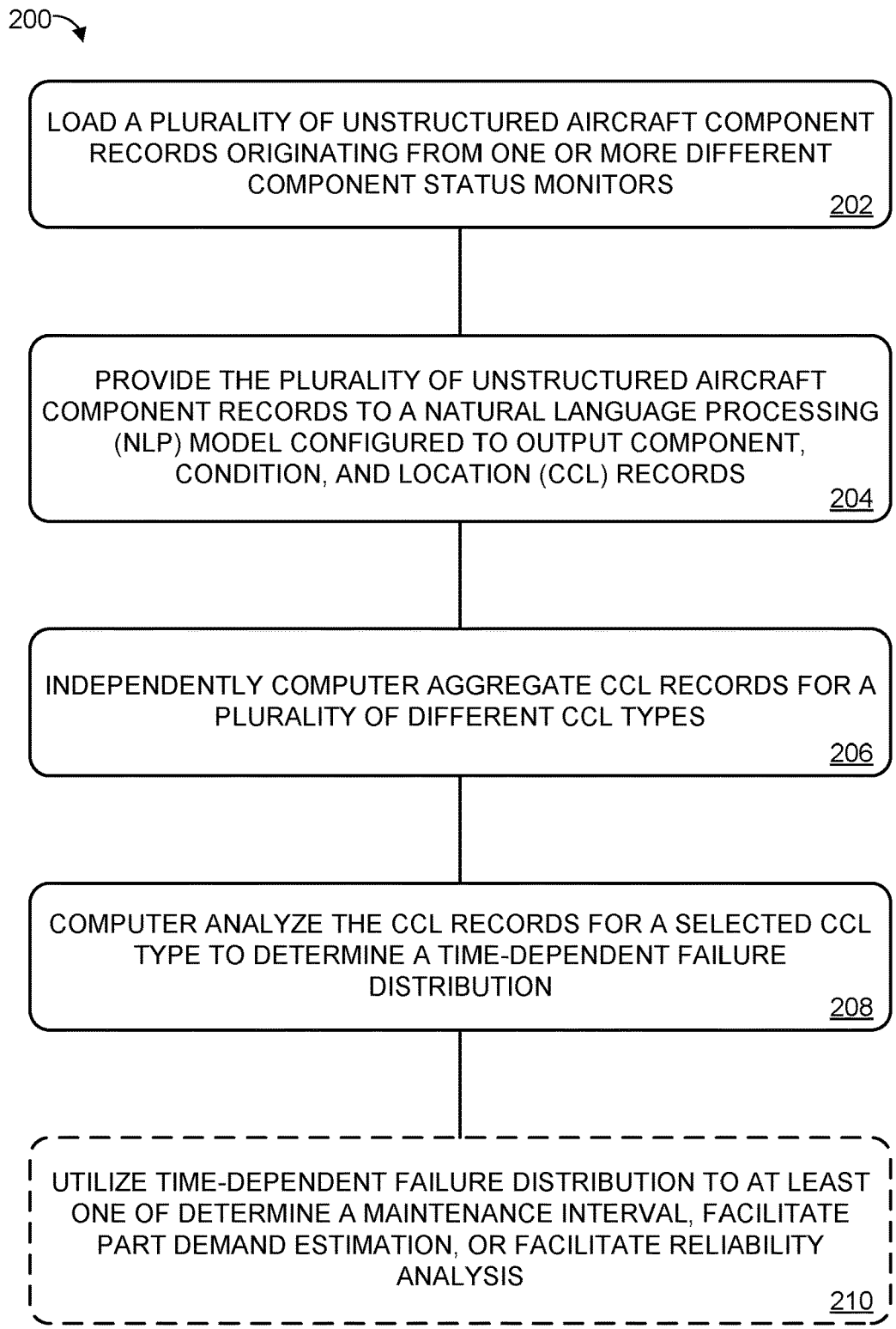
FIG. 2 shows an example method for aircraft maintenance.

FIG. 2 illustrates an example method 200 for aircraft maintenance. Method 200 can be implemented by any suitable computing system of one or more computing devices. A computing system that implements method 200 can have any suitable capabilities, form factor, and hardware configuration. In some examples, one or more steps of method 200 can be implemented by computing system 300 described below with respect to FIG. 3, and/or one or more steps of method 200 can be implemented by computing system 800 described below with respect to FIG. 8.

Figure 3:
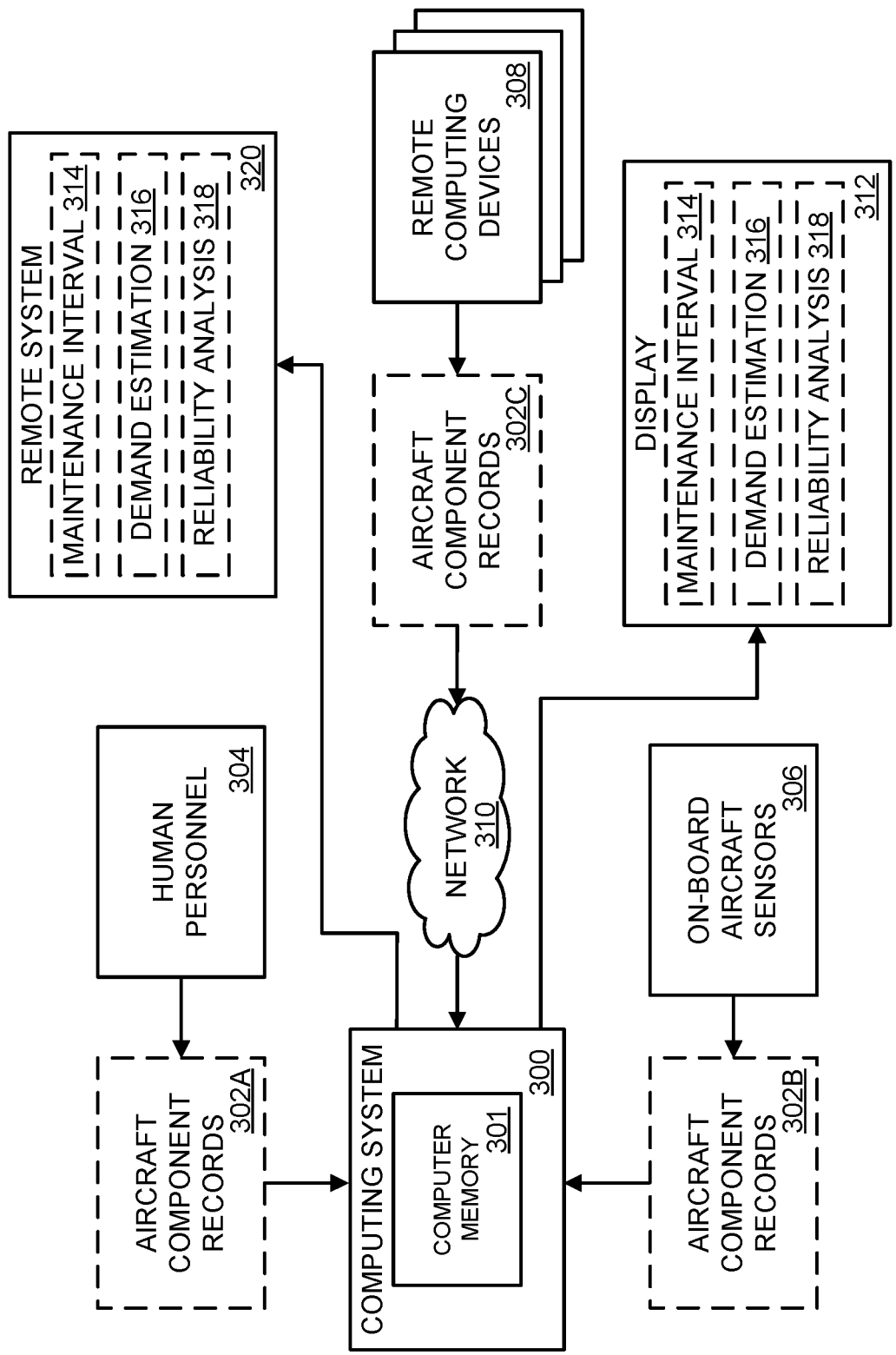
FIG. 3 schematically illustrates a computing system loading a plurality of unstructured aircraft component records.

At 202, method 200 includes loading, into computer memory, a plurality of unstructured aircraft component records originating from one or more different component status monitors. This is schematically illustrated with respect to FIG. 3. Specifically, FIG. 3 schematically shows an example computing system 300 that loads a plurality of different unstructured aircraft component records 302A, 302B, and 302C into computer memory 301.

Computing system 300 can comprise one or more distinct computing devices working collaboratively. In some examples, computing system 300 can be implemented as computing system 800 described below with respect to FIG. 8. "Computer memory" as described herein can refer to any suitable volatile or non-volatile data storage technology. For example, loading unstructured aircraft component records into computer memory can include accessing one or more unstructured aircraft component records from local non-volatile storage, from an external storage device, and/or over a network. From there, the unstructured aircraft component records can be loaded into volatile storage (e.g., random access memory), from which they can be processed by a suitable logic component of the computing system (e.g., a computer processor). Furthermore, it will be understood that the information in an unstructured aircraft component record can have an original source that is analog rather than digital—e.g., handwritten notes that are digitized via OCR or manually retyped.

As discussed above, the plurality of unstructured aircraft component records describe observed maintenance conditions of a plurality of different aircraft components in an unstructured manner—e.g., by using heterogeneous data formats or descriptive terms that do not follow a pre-defined organizational system. In general, an unstructured aircraft component record can include virtually any information relevant to the current maintenance condition of a particular aircraft component. As non-limiting examples, such information can include some indication as to the identity of the component (such as its name, function, and/or location within the aircraft); whether the component is currently operable; whether it has sustained any damage that affects its appearance or functionality; how long it has been since the component was last installed, serviced, or replaced; or whether the component has been modified or customized in any way. Due to the unstructured nature of the plurality of unstructured aircraft component records, the specific information included in each record, as well as the manner in which such information is expressed, will often vary from one record to another.

Unstructured aircraft component records originate from one or more different component status monitors. In one example, the one or more different component status monitors can include one or more human personnel (e.g., human personnel 108 of FIG. 1). In FIG. 3, aircraft component records 302A are received by computing system 300 from one or more different human personnel 304. Such human personnel can include, as examples, aircraft crew members; maintenance workers; other employees of an airline, airport, or aircraft manufacturer; representatives of a regulatory agency; or aircraft passengers (e.g., who report observed maintenance conditions via a survey, on social media, or directly to an individual involved in aircraft maintenance).

In the event that an unstructured aircraft component record originates from a human component status monitor, the human can provide the record to the computing system in any suitable way. For example, the human can directly interact with the computing system—e.g., by typing using a keyboard, speaking aloud to a voice recognition device, or interacting with a touch-sensitive display. Additionally, or alternatively, the human component status monitors can generate unstructured aircraft component records on another computing device (e.g., a portable device), and the records can be transferred or copied to the computing system in any suitable way (e.g., by uploading to a shared database, copying to an intermediate storage device, transmitting using a suitable communications protocol, or transferring over a suitable computer network). As another example, the human can write the unstructured aircraft component record on paper or another analog medium, which can be digitized and provided to the computing system (e.g., via imaging or scanning). For example, handwritten records in a logbook or notepad can be manually retyped into the computer, or they can be scanned, recognized via optical character recognition (OCR), and translated into digital text records.

As another example, the one or more different component status monitors can include one or more on-board aircraft sensors (e.g., sensor 110 of FIG. 1). In FIG. 3, unstructured aircraft component records 302B are received by computing system 300 from one or more on-board aircraft sensors 306. Such sensors can include, as non-limiting examples, cameras, microphones, thermometers, motion sensors, pressure sensors, or moisture sensors (e.g., to detect that an electronic device was exposed to water or another liquid). It will be understood that the specific manner in which such sensors detect maintenance conditions will vary significantly depending on both the type of sensor, the type of aircraft component, and the type of maintenance condition that is reported. Once again, the unstructured aircraft component records can be provided to the computing system in any suitable way. As non-limiting examples, the one or more on-board aircraft sensors can directly interface with the computing system, can transmit data to the computing system over a suitable computer network, and/or can write the unstructured aircraft component records to a suitable storage medium from which they can be transferred to the computing system.

Furthermore, in the event that unstructured aircraft component records originate from on-board aircraft sensors, the records can take the form of raw data (e.g., a digital image), or processed data (e.g., classification data derived from a digital image that has been interpreted by a machine vision algorithm to identify a particular maintenance issue). It will be understood that, depending on the implementation, on-board aircraft sensors can output either or both of raw data and processed data, and that different sensors of the same type (e.g., cameras) can output data having different formats. Regardless, as will be described in more detail below, the NLP model can be trained to resolve such discrepancies and output records in a standardized, structured format.

Additionally, or alternatively, the computing system can be a cloud computing system configured to receive the plurality of unstructured aircraft component records from a plurality of remote computing devices over a computer network. This is also schematically illustrated in FIG. 3, in which computing system 300 receives aircraft component records 302C from a plurality of remote computing devices 308 over a computer network 310. For example, different remote computing devices can correspond to different parties involved in maintaining the same or different aircraft (e.g., different airlines, airports, maintenance workers, aircraft owners, regulatory agencies), and the plurality of unstructured aircraft component records can be generated at, or initially provided to, the remote computing devices by one or more different component status monitors as discussed above. From there, the cloud computing system can process the unstructured aircraft component records as will be described in more detail below. Because the cloud computing system has access to more unstructured aircraft component records than any individual remote computing device, potentially more significant trends can be identified (e.g., maintenance issues affecting multiple different aircraft or component types) than would be possible if each remote computing device analyzed only its own set of unstructured aircraft component records. In some examples, cloud-based analysis of a plurality of unstructured aircraft component records can be offered as a service to a plurality of different customers (e.g., airlines, aircraft owners).

Returning briefly to FIG. 2, at 204, method 200 includes providing the plurality of unstructured aircraft component records from computer memory to an NLP model configured to output a corresponding plurality of digital structured aircraft component records. As discussed above, the subject disclosure primarily describes such structured records as taking the form of CCL (component, condition, location) records, as one non-limiting example of a suitable structured schema. It will be understood, however, that any suitable structured schema can be used, provided that the structured records each use a same pre-defined data format or organizational system.

Figure 4:
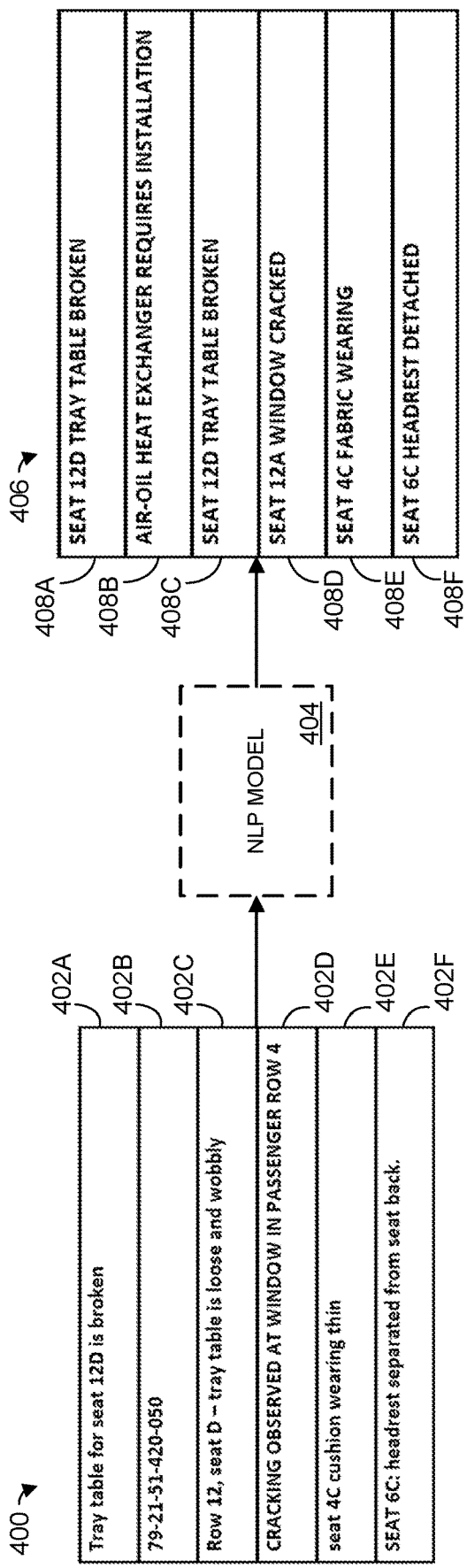
FIG. 4 schematically illustrates a natural language processing (NLP) model outputting component, condition, and location (CCL) records from unstructured aircraft component records.

Providing unstructured aircraft component records to an NLP model is schematically illustrated with respect to FIG. 4. Specifically, FIG. 4 depicts an example plurality of unstructured aircraft component records 400, including individual unstructured records 402A-402F. Such unstructured records are provided to an NLP model 404, which outputs a corresponding plurality of structured records 406, including individual structured records 408A-408F. In this example, the structured records are CCL records, as they each specify the identity of a particular aircraft component, its location within the aircraft, and its current maintenance condition. For example, CCL record 408A specifies that a tray table (component) at seat 12D (location) is broken (condition). It will be understood that, while FIG. 4 shows six example unstructured records corresponding to six example CCL records, any number of unstructured aircraft component records can be provided to the NLP model.

Furthermore, it will be understood that structured aircraft component records, including CCL records, can include any type of information regarding the aircraft component, including information not explicitly described herein. As another example, structured aircraft component records can include an indication of an age of the aircraft component. In this manner, the computing system can determine at what point different aircraft components become damaged or broken during their lifecycle.

The NLP model can take any suitable form. In general, the NLP model can be implemented via any suitable artificial intelligence (AI) and/or machine learning (ML) technologies suitable for converting unstructured records that include natural language into corresponding structured records. Examples of suitable AI and/or ML techniques are provided below with respect to FIG. 8. As one specific non-limiting example, the NLP model can be implemented as a convolutional neural network (CNN) previously trained with a multitude of ground-truth labeled training data.

As discussed above, the plurality of unstructured aircraft component records can include a wide variety of different information, which can be organized and expressed in highly variable ways from one record to another. To this end, the NLP model can be trained to output CCL records from a wide variety of different unstructured aircraft component records. Such training can be done in any suitable way. As one example, the NLP model can be previously trained via a supervised learning process in which a training set of unstructured aircraft component records are manually labeled from a predetermined menu of CCL labels. For example, a human annotator can be provided with the training set of unstructured records, then for each unstructured record, the human annotator can select one or more CCL labels suitable for the unstructured record. In this manner, the NLP model can be trained to output CCL records from novel unstructured records provided to it.

Furthermore, training of the NLP model can be repeated or reinforced any number of times—e.g., to account for changes in terminology, changes in aircraft design (e.g., adding or replacing aircraft components), or inadequate performance of the NLP model. In other words, the NLP model can be retrained via a reinforcement training process, in which an updated training set of unstructured aircraft component records are manually labeled from the predetermined menu of CCL labels (or an updated menu of CCL labels). In this manner, the performance of the NLP model can be updated or improved over time.

It will be understood, however, that the training processes described above are not limiting, and that an NLP model can be trained to output CCL records (and/or other types of structured aircraft component records) in any suitable way. For example, an alternate training process can utilize an unsupervised learning process as opposed to a supervised learning process.

In any case, the NLP model outputs a plurality of CCL records from a plurality of unstructured aircraft component records, where the unstructured aircraft component records often take a wide variety of different forms and express different types of information in variable ways. As discussed above, the unstructured aircraft component records can originate from any variety of different sources. As non-limiting examples, the NLP model can be configured to output the plurality of CCL records from unstructured aircraft component records that originate from one or more of an aircraft logbook, aircraft maintenance records, aircraft modification records, aircraft service bulletin records, component removal records, cabin maintenance records, and existing aircraft maintenance schedules. The information included in each unstructured record, and the formatting used to express such information, can vary depending on the author of the records, the source of the record, the type of maintenance condition described by the record, etc.

For example, the NLP model can be configured to output the plurality of CCL records from unstructured aircraft component records that include freeform human-written records. Such records can, for instance, be hand-written by a human component status monitor on a notepad, paper logbook, touch-sensitive display, etc. Notably, different human component status monitors can frequently describe the same maintenance condition in different ways—e.g., using different formatting, punctuation, and descriptive terms. By implementing the techniques described herein, the training burden on the individual human component status monitors is reduced, as they are less constrained to using a particular pre-approved record format to facilitate easier downstream record processing. Rather, the NLP model can address discrepancies between different unstructured records generated by different human authors. This can have the effect of reducing overall maintenance costs—e.g., as less is spent on training human maintenance workers to record issues using strict standardized formats.

Freeform human-written records can be interpreted by the NLP model in any suitable way—e.g., the records may have previously been translated into digital computer text via OCR as discussed above, the records can be manually re-typed by a human user prior to the record being provided to the NLP model, or the NLP model may have been trained on freeform human-written records.

In some examples, the NLP model can be configured to output the plurality of CCL records from unstructured aircraft component records that use a plurality of inconsistent descriptive terms to describe the observed maintenance conditions of the plurality of different aircraft components, while the plurality of CCL records use a consistent set of descriptive terms to describe the observed maintenance conditions. See, for example, unstructured aircraft component records 402A and 402C depicted in FIG. 4, in which a tray table is alternately referred to as "broken" in record 402A, and "loose and wobbly" in record 402C. By contrast, CCL records 408A and 408C consistently use the same descriptive term "broken" to refer to the maintenance issue with the tray table.

In this example, the two unstructured aircraft component records 402A and 402C use different descriptive terms to describe a same maintenance problem with a same aircraft component of the plurality of different aircraft components—e.g., the condition of the same tray table is described in two different ways. Regardless, the NLP model is configured to output equivalent CCL records 408A and 408C, which use the same descriptive terms to refer to the same problem with the tray table—e.g., the tray table for seat 12D is broken. It will be understood, however, that unstructured aircraft component records can use inconsistent descriptive terms to describe maintenance conditions of different aircraft components (e.g., tray tables for different seats), and the corresponding CCL records output by the NLP model can still use consistent descriptive terms to refer to such maintenance conditions.

Additionally, or alternatively, the NLP model can be configured to output the plurality of CCL records from unstructured aircraft component records that use a plurality of different data formats to describe the observed maintenance conditions of the plurality of different aircraft components, while the plurality of CCL records use a same structured data format to describe the observed maintenance conditions. In the example of FIG. 4, many of the unstructured aircraft component records are expressed using natural language (e.g., English words), although the formatting and punctuation of such natural language varies from one record to another—e.g., depending on the author of the record. By contrast, the corresponding plurality of CCL records each use substantially the same formatting and punctuation.

Furthermore, unstructured aircraft component record 402B uses yet another data format to describe the maintenance condition of an aircraft component—specifically, an Air Transport Association (ATA) code relating to the oil system of the aircraft. Regardless, the NLP model outputs a corresponding CCL record 408B that uses a same structured data format as the other CCL records, corresponding to other unstructured aircraft component records—e.g., natural language words. Thus, the NLP model can be configured to output the plurality of CCL records from unstructured aircraft component records that include ATA codes.

However, it will be understood that the unstructured aircraft component records described herein are non-limiting examples. As discussed above, the NLP model can be configured to output corresponding CCL records from a wide variety of different unstructured aircraft component records, including records having sources, formatting, information, etc., not explicitly described herein.

Figure 5:
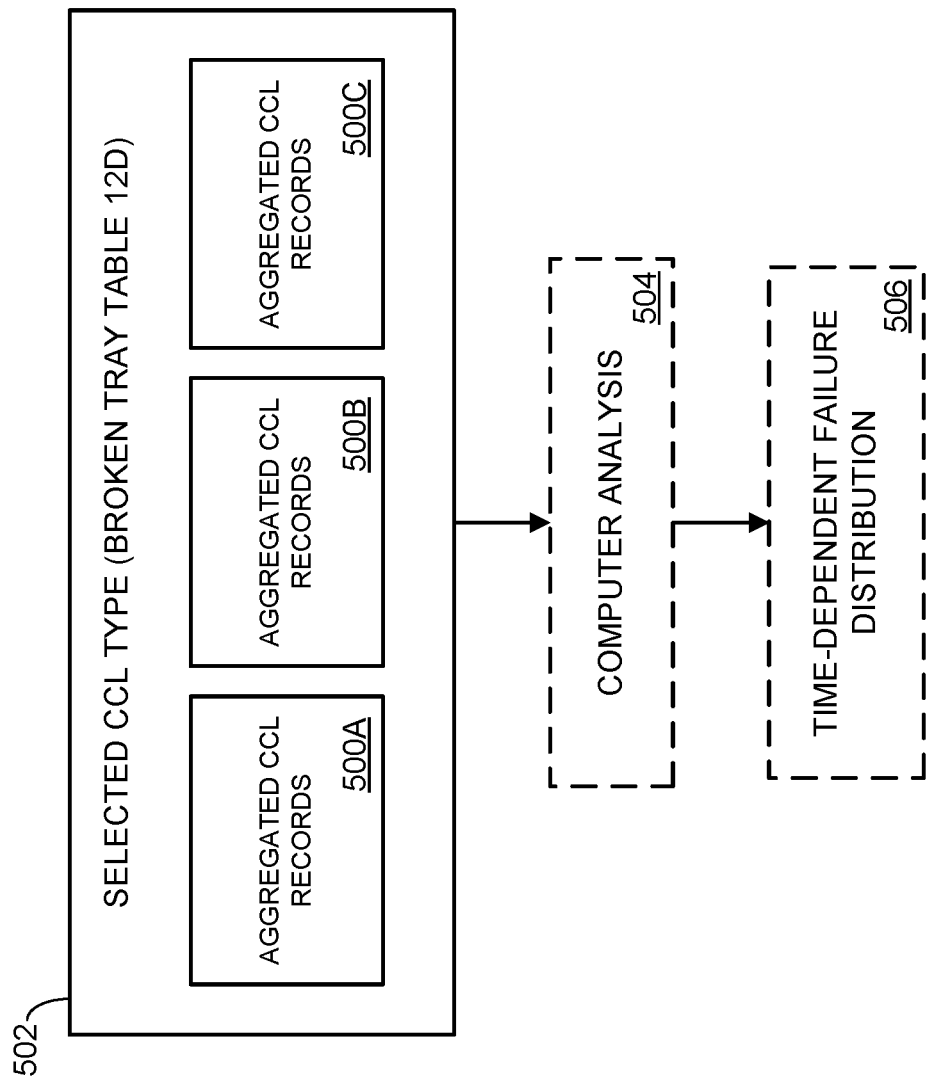
FIG. 5 schematically illustrates computer-analyzing aggregated CCL records for a selected CCL type to determine a time-dependent failure distribution.

Returning briefly to FIG. 2, at 206, method 200 includes independently computer aggregating CCL records for a plurality of different CCL types. In other words, for each individual CCL type, the computing system can aggregate any CCL records matching that CCL type. This is schematically illustrated with respect to FIG. 5, in which several CCL records 500A, 500B, and 500C are aggregated for a selected CCL type 502 (in this example, a broken tray table at seat 12D). Such CCL records can, for example, correspond to different instances at which the tray table for seat 12D was broken on a particular aircraft, and/or records corresponding to broken seat 12D tray tables on a plurality of different aircraft of the same model.

This can facilitate determining the rate at which any particular failure occurs in one or more different aircraft. For example, as discussed above, the computing system can access some indication of the age of each aircraft component when the damage or failure referenced by a corresponding CCL record occurred. The "age" of an aircraft component can refer to the amount of time (e.g., hours, days, months, years) since the component was manufactured or installed, the number of total flights performed while the component was in use, the number of passengers served, the number of on-off cycles the component has performed, etc. It will be understood that the "age" of a component can be expressed in any suitable way.

Such information can, for instance, be included in the CCL records themselves, and/or in a separate database. By independently aggregating CCL records for a selected CCL type corresponding to an observed problem with an aircraft component, the computing system can facilitate determining steps to mitigate or alleviate the problem in the future, as will be described in more detail below. Furthermore, it will be understood that, even though FIG. 5 only illustrates aggregation of CCL records for a single CCL type (e.g., a broken seat 12D tray table), CCL records for any number of different CCL types can be independently aggregated.

Returning briefly to FIG. 2, at 208, method 200 includes computer analyzing the CCL records for a selected CCL type to determine a time-dependent failure distribution for the selected CCL type. This is also schematically illustrated in FIG. 5, in which a computer analysis 504 is performed on the aggregated CCL records 500A-C of the selected CCL type 502 to output a time-dependent failure distribution 506.

It will be understood that a "selected CCL type" can have any suitable granularity. For instance, a "selected CCL type" can refer specifically to one aircraft seat (e.g., seat 14A), as some aircraft components can exhibit unique types of damage or failures depending on their location within an aircraft—e.g., seats in an exit row. In other examples, a "selected CCL type" can refer more broadly to a particular class of aircraft components—e.g., all seats in a particular aircraft model, or all seats used in multiple different aircraft models.

In some examples, determining a time-dependent failure distribution for a selected CCL type can include fitting a cumulative distribution function to the CCL records for the selected CCL type. For instance, the cumulative distribution function can take the form of a Weibull distribution, or any other suitable cumulative distribution function. In one example, calculating the time-dependent failure distribution can include calculating the shape parameter β in the following function for each selected CCL type, where F is the cumulative distribution function, t is the time to failure (greater than zero), α is a scale parameter, and β is the shape parameter:

$$F(t, \alpha, \beta) = 1 - e^{-\left(\frac{t}{\alpha}\right)^{\beta}}$$

The value of the shape parameter β relative to a threshold value (e.g., one) can provide information regarding the nature of the failures affecting the aircraft component of the selected CCL type. This is illustrated with respect to FIGS. 6A and 6B. FIG. 6A shows an example plot 600 that includes three different hypothetical time-dependent failure distributions 602A, 602B, and 602C. Specifically, plot 600 indicates instances of hypothetical failures of aircraft components over time consistent with different failure distributions. The different time-dependent failure distributions are characterized by having different values of the shape parameter β as compared to a threshold value of one. It will be understood that, in other implementations, other suitable threshold values can be used.

As shown, distribution 602A has a shape parameter β of less than one, meaning the CCL records of the selected CCL type are consistent with a high rate of failure relatively early in the lifecycle of the aircraft component. In other words, based at least in part on determining that the shape parameter β for the selected CCL type is less than a threshold value, the computing system can determine that the time-dependent failure distribution for the selected CCL type is consistent with a relatively high rate of early component failure.

By contrast, distribution 602B has a shape parameter β of approximately one. This means the incidence rate of failures for the aircraft component remains relatively stable over the lifecycle of the aircraft component. In other words, based at least in part on determining that the shape parameter β is equal to a threshold value, the computing system can determine that the time-dependent failure distribution for the selected CCL type is a memoryless failure distribution consistent with random damage. For example, the damage or failures associated with the selected CCL type can be caused by inadvertent or intentional passenger damage that has an approximately equal likelihood of occurrence regardless of how old the aircraft component is.

Additionally, distribution 602C has a shape parameter β of greater than one. This indicates that the rate of failure for the selected CCL type is relatively low early in the lifespan of the aircraft component, though increases as the aircraft component ages. This can be a sign that the damage is associated with wear-and-tear—e.g., the damage or failure is caused by gradual degradation caused by repeated or ongoing use of the aircraft component during its lifespan. In other words, based at least in part on determining that the shape parameter β has higher than a threshold value, the computing system can determine that the time-dependent failure distribution for the selected CCL type is consistent with wear-and-tear.

Figure 6B:
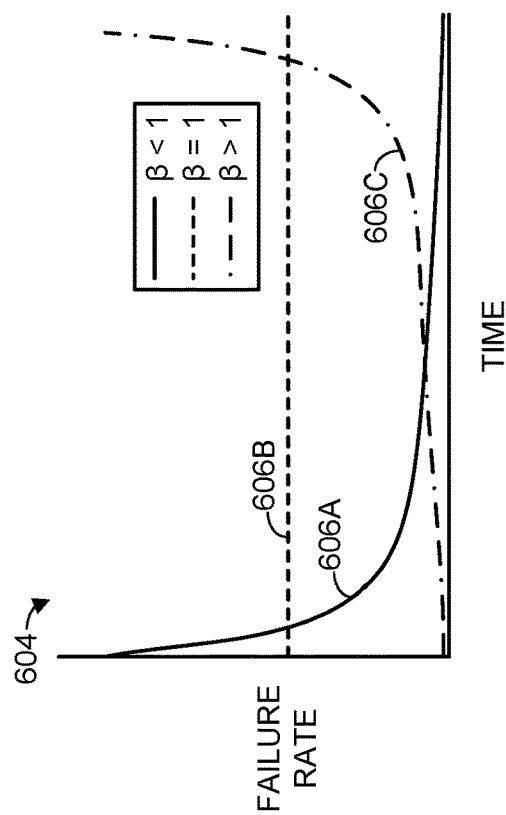
FIGS. 6A and 6B show plots depicting different example time-dependent failure distributions.
Figure 6A:
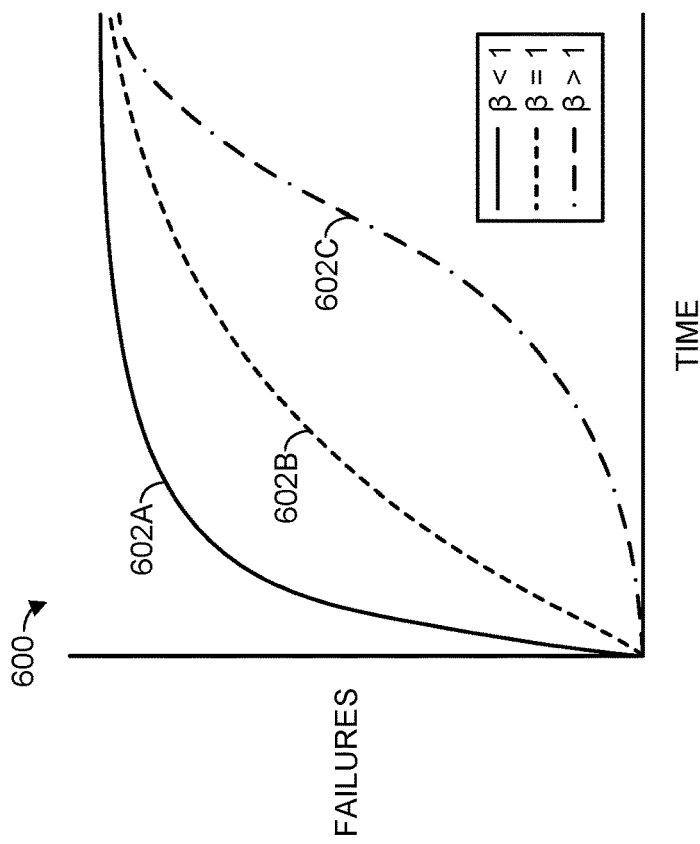

FIG. 6B shows another example plot 604 that again shows three different hypothetical example time-dependent failure distributions 606A, 606B, and 606C. Once again, the three distributions are characterized by having different values of the shape parameter β as compared to a threshold value of one. However, plot 604 illustrates the change in failure rate over time, as opposed to the incidence of observed failures over time shown in plot 600. As shown, distribution 606A, having a shape parameter β of less than the threshold value, exhibits a high failure rate early in the lifecycle of the aircraft component. Distribution 606B, having a shape parameter β approximately equal to the threshold, exhibits a failure rate that is substantially unchanged over time (e.g., consistent with memoryless random damage). Distribution 606C, having a shape parameter β greater than the threshold value, exhibits a failure rate that increases over time—e.g., consistent with wear-and-tear.

In some cases, based at least in part on the time-dependent failure distribution, the computing system can identify a remedial action to address an observed failure affecting the selected CCL type. As one non-limiting example, based at least in part on determining that a particular type of aircraft component is failing early in its lifecycle (e.g., due to being at least partially defective, or having a design flaw), the computing system can recommend globally replacing the aircraft component with another model less prone to failure, and/or recommend reevaluating the design of the aircraft component to attempt to identify the cause of the failures. As another non-limiting example, based at least in part on determining that a particular type of aircraft component is suffering damage caused by passengers, the recommended remedial action can include adding a warning label. It will be understood that the types of remedial actions identified can vary significantly depending on both the type of aircraft component in question and the type of damage or failure affecting the aircraft component.

Notably, the type of time-dependent failure distribution identified for the selected CCL type can influence the type of remedial action identified. For instance, if the distribution has a shape parameter β of approximately one, then any particular damaged component is not necessarily a sign that other similar components are also likely to fail. Thus, the remedial action can include simply replacing damaged components as needed, rather than performing prophylactic maintenance or replacement of other components. By contrast, a distribution characterized by a shape parameter β of higher than one can indicate that when one component fails, other components of similar age are also likely to fail. Thus, the recommended remedial action can include preemptively replacing all affected components older than a certain age, regardless of whether they are yet showing signs of damage or failure. This can, for instance, prevent the need for inefficient unscheduled maintenance later on.

Any number of different factors can be considered by the computing system in identifying a remedial action for an observed failure affecting a selected CCL type. As one non-limiting example, the remedial action can be identified based on one or both of a technical severity index derived from the CCL records for the selected CCL type, and a passenger inconvenience index derived from one or more passenger information sources. The technical severity index can, for example, refer to the extent to which the observed failure impacts operation of the aircraft. For instance, failure of a seat tray table will likely have an overall lower technical severity than failure of a lavatory toilet. The technical severity index can be calculated in any suitable way—e.g., the computing system can correlate observed failures with historical service interruptions and automatically determine which observed failures are more severe. It will be understood, however, that different entities can have different priorities with regard to technical severity—e.g., one airline can interpret a particular failure as having a greater technical severity than another airline. Thus, assigning a technical severity index to a particular observed failure can in some cases be done based at least in part on inputs or preferences received from one or more users.

Additionally, or alternatively, the remedial action can be identified based at least in part on a passenger inconvenience index derived from one or more passenger information sources. In general, the passenger inconvenience index can refer to the extent to which an observed failure inconveniences passengers, or otherwise contributes to the passenger forming a negative impression of the aircraft or airline. For instance, a failure of the in-flight entertainment system has a relatively low impact on overall aircraft operations, but is likely to cause significant passenger dissatisfaction. Thus, the failure of the in-flight entertainment system can be rated as having a higher passenger inconvenience index than, for example, a leaking lavatory sink.

The passenger inconvenience index can be derived in any suitable way based on any suitable passenger information sources. As non-limiting examples, the passenger information sources can include one or more of passenger surveys (e.g., administered by an airline) and passenger social media posts (e.g., directed to the airline or aircraft owner). It will be understood, however, that any passenger data utilized by the techniques herein should be handled with respect for passenger privacy, and thus can in some cases only be collected with explicit passenger consent (e.g., via opt-in). Furthermore, any collected passenger information can in some cases be encrypted, anonymized, and/or follow strict retention limits to preserve passenger data privacy.

The technical severity index, passenger inconvenience index, and/or any other considerations can be weighted or considered in any suitable way in determining a remedial action for the selected CCL type. For instance, based on either or both of the technical severity index or passenger inconvenience index being high, and the time-dependent failure distribution indicating that components of the selected CCL type are frequently failing early in the component's lifecycle, the identified remedial action can be to immediately replace all aircraft components of the specified model with a more reliable model. By contrast, if the technical severity index and/or passenger inconvenience index are relatively lower, the identified remedial action can be to gradually phase out the affected aircraft component, or to generally investigate modifications or design changes that will address the problem.

It will be understood that the time-dependent failure distribution determined as discussed above can be used in any number of different ways to enhance aircraft operations and aircraft component maintenance, in addition to or as an alternative to the processes described thus far. Accordingly, returning briefly to FIG. 2, at 210, method 200 optionally includes utilizing the time-dependent failure distribution to determine a maintenance interval, facilitate part demand estimation, and/or facilitate a reliability analysis associated with the selected CCL type.

In some examples, this information can be presented on a display for viewing, and/or transmitted to a remote system. Returning briefly to FIG. 3, computing system 300 is communicatively coupled with a display 312, which is configured to render any or all of a maintenance interval 314, part demand estimation 316, and a reliability analysis 318, for review by one or more human users. The display can be locally connected to the computing system, or can be remotely-located—e.g., any or all of the maintenance interval 314, part demand estimation 316, and reliability analysis 318 can be transmitted to display 312 via network 310 for presentation.

Similarly, any or all of the maintenance interval 314, part demand estimation 316, and reliability analysis 318 can be transmitted to a remote system 320 for storage and/or analysis. The remote system can, as non-limiting examples, take the form of a remote maintenance system, inventory management system, or a vehicle health monitoring system. Furthermore, as with display 312, the information transmitted to remote system 310 can in some cases be transmitted over network 310.

Each of the maintenance interval, part demand estimation, and/or reliability analysis can be determined in any suitable way. For instance, determining a maintenance interval based on the time-dependent failure distribution can include determining the likelihood that an observed failure will occur over a particular window of time. The maintenance interval for the selected CCL type can then be set to reduce the predicted failure rate for the selected CCL type to below a predetermined failure risk threshold. For example, the time-dependent failure distribution can indicate that a particular failure (e.g., worn seat fabric) has a 30% failure rate over a 3-year interval. The airline, aircraft owner, and/or other relevant party can determine, for example, that this failure rate is unacceptably high, and specify a failure risk threshold of 15% over the 3-year interval. Based on this, the computing system can recommend an adjusted maintenance interval, in which maintenance on the seat fabric (e.g., chemical treatments, reupholstery) is conducted more frequently to reduce the failure risk to below the specified threshold.

Similarly, in some cases the time-dependent failure distribution can be used to increase a maintenance interval for a selected CCL type, rather than decrease the maintenance interval. For example, if a particular component has an observed failure rate of approximately 5% over a period of time, and the failure risk threshold is 15%, then the frequency of maintenance can be decreased to reduce maintenance costs and increase aircraft operability, while still keeping the rate of component failures within a tolerable range.

Facilitating part demand estimation can be done based at least in part on determining the rate at which a particular aircraft component fails and requires replacement. For example, the selected CCL type can refer to lightbulbs in the interior cabin of the aircraft failing at a particular rate over time. Based on this rate, the computing system can estimate the future demand for replacement lightbulbs. This information can be used to change the frequency with which replacement lightbulbs (or other aircraft components) are ordered—e.g., to take advantage of bulk order rates and achieve cost savings.

Furthermore, as discussed above, the time-dependent failure distribution determined for a particular CCL type can be used to evaluate the overall reliability of an underlying aircraft component. For example, upon determining that the shape parameter $\beta$ for the time-dependent failure distribution is less than the threshold value (e.g., one), the computing system can determine that the underlying aircraft component exhibits a high frequency of failures relatively early in its lifecycle, indicating reliability issues. In this manner, the computing system can flag the aircraft component as being unreliable, and recommend replacement or a change in design.

The subject disclosure has described various types of analysis that can be performed by a computing system on structured aircraft component records (e.g., CCL records) output by an NLP model. The results of such analysis, and/or the structured records themselves, can in some cases be visualized for review by a human user in various suitable ways. As non-limiting examples, CCL records for a selected CCL type can optionally be visualized using at least one of a heat map, a pareto chart, or a severity chart.

Figure 7:
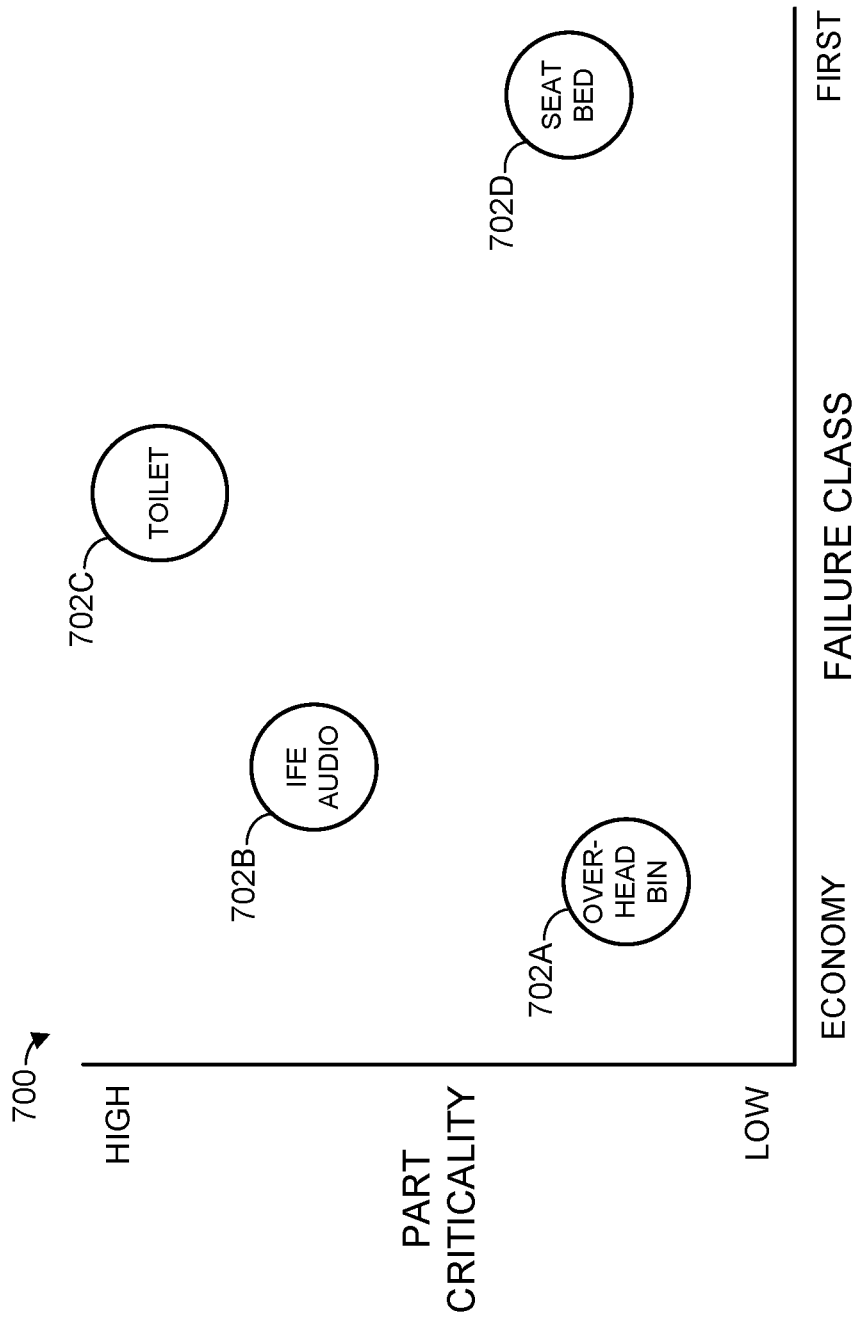
FIG. 7 schematically shows an example visualization of CCL records.

FIG. 7 schematically shows one example visualization of CCL records corresponding to multiple selected CCL types, taking the form of a severity chart. Specifically, chart 700 includes representations of multiple selected CCL types 702A-702D, plotted according to a failure class axis (e.g., economy, business class, first class), and a part criticality axis (e.g., the extent to which failure of the aircraft component affects operations of the aircraft). In some cases, different regions within severity chart 700 can be defined, and the manner in which different component failures are handled can be determined by which defined region they fall into. For example, maintenance of a selected CCL type falling in a high-priority region (e.g., having both a high failure class and a high part criticality) can be prioritized over maintenance of a selected CCL type falling in a low-priority region (e.g., having both a low failure class and a low part criticality). However, it will be understood that any number of different severity chart regions can be defined in any suitable way, and that in some examples, no distinct regions need be identified.

It will be understood that chart 700 is deliberately simplified and provided only for the sake of example. In practical cases, a severity chart can include any number of different selected CCL types, plotted according to any suitable criteria (e.g., failure class, part criticality, failure frequency, passenger inconvenience, technical severity). Furthermore, it will be understood that a computing system can output any number of visualizations of CCL data in addition to, or instead of, a severity chart. For instance, a heat map can be used to visualize the rate of occurrence of different failures relative to an entire aircraft, and/or different select regions within the aircraft. Furthermore, a pareto chart can be used to visualize an entire population of observed failures affecting components of an aircraft, sorted by their frequency of occurrence.

A visualization of a selected CCL type can be delivered to a user in any suitable way. In one example, the computing system can determine visualization data indicative of a visualization for the selected CCL type, and transmit the visualization data to a client device. The visualization data can take any suitable form. In one example, the visualization data can use a pre-defined schema that allows the visualization data to be rendered by software on the client device (e.g., database software, word processor, web browser) to provide an interactive visualization. As another example, the visualization data can take the form of image data that can be rendered by the client device as a static image.

The methods and processes described herein can be tied to a computing system of one or more computing devices. In particular, such methods and processes can be implemented as an executable computer-application program, a network-accessible computing service, an application-programming interface (API), a library, or a combination of the above and/or other compute resources.

Figure 8:
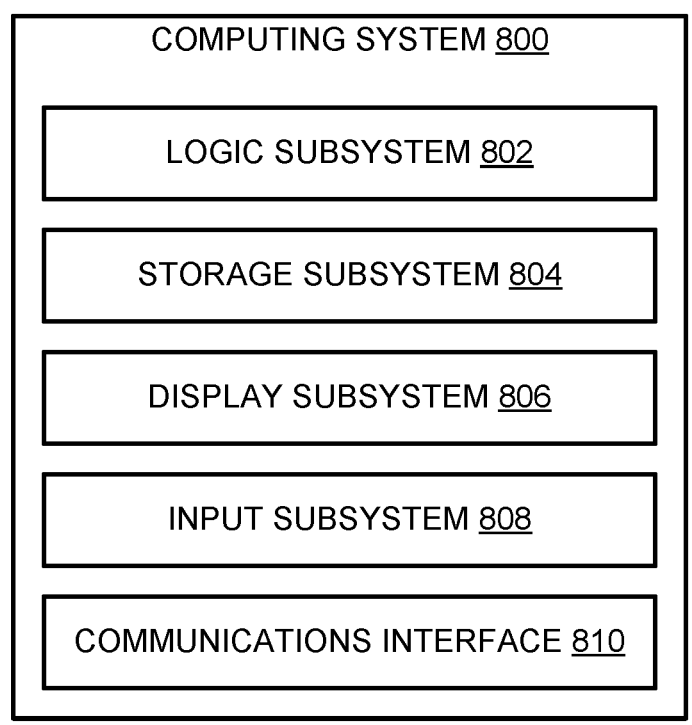
FIG. 8 schematically shows an example computing system.

FIG. 8 schematically shows a simplified representation of a computing system 800 configured to provide any to all of the compute functionality described herein. Computing system 800 can take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 includes a logic subsystem 802 and a storage subsystem 804. Computing system 800 can optionally include a display subsystem 806, input subsystem 808, communication subsystem 810, and/or other subsystems not shown in FIG. 8.

Logic subsystem 802 includes one or more physical devices configured to execute instructions. For example, the logic subsystem can be configured to execute instructions that are part of one or more applications, services, or other logical constructs. The logic subsystem can include one or more hardware processors configured to execute software instructions. Additionally, or alternatively, the logic subsystem can include one or more hardware or firmware devices configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices can be collocated and/or remotely located. Storage subsystem 804 can include volatile, nonvolatile, dynamic, static, read/write, read-only, random-access, sequential-access, location-addressable, file-addressable, and/or content-addressable devices. Storage subsystem 804 can include removable and/or built-in devices. When the logic subsystem executes instructions, the state of storage subsystem 804 can be transformed—e.g., to hold different data.

Aspects of logic subsystem 802 and storage subsystem 804 can be integrated together into one or more hardware-logic components. Such hardware-logic components can include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem can cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine can be instantiated by a single computing device, or a machine can include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality can optionally be saved as one or more unexecuted modules on one or more suitable storage devices.

Machines can be implemented using any suitable combination of state-of-the-art and/or future machine learning (ML), artificial intelligence (AI), and/or natural language processing (NLP) techniques. Non-limiting examples of techniques that can be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein can be implemented using one or more differentiable functions, wherein a gradient of the differentiable functions can be calculated and/or estimated with regard to inputs and/or outputs of the differentiable functions (e.g., with regard to training data, and/or with regard to an objective function). Such methods and processes can be at least partially determined by a set of trainable parameters. Accordingly, the trainable parameters for a particular method or process can be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein can be trained simultaneously with regard to an objective function measuring performance of collective functioning of the plurality of components (e.g., with regard to reinforcement feedback and/or with regard to labelled training data). Simultaneously training the plurality of methods, processes, and/or components can improve such collective functioning. In some examples, one or more methods, processes, and/or components can be trained independently of other components (e.g., offline training on historical data).

When included, display subsystem 806 can be used to present a visual representation of data held by storage subsystem 804. This visual representation can take the form of a graphical user interface (GUI). Display subsystem 806 can include one or more display devices utilizing virtually any type of technology. In some implementations, display subsystem can include one or more virtual-, augmented-, or mixed reality displays.

When included, input subsystem 808 can comprise or interface with one or more input devices. An input device can include a sensor device or a user input device. Examples of user input devices include a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 can be configured to communicatively couple computing system 800 with one or more other computing devices. Communication subsystem 810 can include wired and/or wireless communication devices compatible with one or more different communication protocols. The communication subsystem can be configured for communication via personal-, local- and/or wide-area networks.

This disclosure is presented by way of example and with reference to the associated drawing figures. Components, process steps, and other elements that can be substantially the same in one or more of the figures are identified coordinately and are described with minimal repetition. It will be noted, however, that elements identified coordinately can also differ to some degree. It will be further noted that some figures can be schematic and not drawn to scale. The various drawing scales, aspect ratios, and numbers of components shown in the figures can be purposely distorted to make certain features or relationships easier to see.

In an example, a method for aircraft maintenance comprises: loading, into computer memory, a plurality of unstructured aircraft component records originating from one or more different component status monitors, the plurality of unstructured aircraft component records describing observed maintenance conditions of a plurality of different aircraft components; providing the plurality of unstructured aircraft component records from computer memory to a natural language processing (NLP) model configured to output a corresponding plurality of digital component, condition, and location (CCL) records for the plurality of different aircraft components; independently computer aggregating CCL records for a plurality of different CCL types; and computer analyzing the CCL records for a selected CCL type to determine a time-dependent failure distribution for the selected CCL type. In this example or any other example, the plurality of different aircraft components are passenger-facing or crew-facing components in an interior cabin of an aircraft. In this example or any other example, the method further comprises utilizing the time-dependent failure distribution to at least one of determine a maintenance interval, facilitate part demand estimation, or facilitate a reliability analysis associated with the selected CCL type. In this example or any other example, the maintenance interval for the selected CCL type is set to reduce a predicted failure rate for the selected CCL type to below a predetermined failure risk threshold. In this example or any other example, the method further comprises, based at least in part on the time-dependent failure distribution, identifying a remedial action to address an observed failure affecting the selected CCL type. In this example or any other example, the remedial action is identified based on one or both of a technical severity index derived from the CCL records for the selected CCL type, and a passenger inconvenience index derived from one or more passenger information sources. In this example or any other example, the one or more passenger information sources comprise one or more of passenger surveys and passenger social media posts. In this example or any other example, the NLP model is a convolutional neural network (CNN) previously trained via a supervised learning process in which a training set of unstructured aircraft component records are manually labeled from a predetermined menu of CCL labels. In this example or any other example, the method further comprises retraining the NLP model via a reinforcement training process, in which an updated training set of unstructured aircraft component records are manually labeled from the predetermined menu of CCL labels. In this example or any other example, the one or more different component status monitors comprise at least one of a user device associated with one or more human personnel or one or more on-board aircraft sensors. In this example or any other example, the NLP model is configured to output the plurality of CCL records from unstructured aircraft component records that comprise freeform human-written records. In this example or any other example, the NLP model is configured to output the plurality of CCL records from unstructured aircraft component records that use a plurality of inconsistent descriptive terms to describe the observed maintenance conditions of the plurality of different aircraft components, the plurality of CCL records using a consistent set of descriptive terms to describe the observed maintenance conditions. In this example or any other example, the NLP model is configured to output equivalent CCL records from two unstructured aircraft component records that use different descriptive terms to describe a same maintenance problem with a same aircraft component of the plurality of different aircraft components. In this example or any other example, the NLP model is configured to output the plurality of CCL records from unstructured aircraft component records that use a plurality of different data formats to describe the observed maintenance conditions of the plurality of different aircraft components, the plurality of CCL records using a same structured data format to describe the observed maintenance conditions. In this example or any other example, the NLP model is configured to output the plurality of CCL records from unstructured aircraft component records that comprise Air Transport Association (ATA) codes. In this example or any other example, the NLP model is configured to output the plurality of CCL records from unstructured aircraft component records that originate from one or more of an aircraft logbook, aircraft maintenance records, aircraft modification records, aircraft service bulletin records, and existing aircraft maintenance schedules. In this example or any other example, determining the time-dependent failure distribution for the selected CCL type comprises calculating a shape parameter β of a cumulative distribution function that fits the CCL records for the selected CCL type. In this example or any other example, the cumulative distribution function is a Weibull distribution. In this example or any other example, the method further comprises, based at least in part on determining that the shape parameter β has higher than a threshold value, determining that the time-dependent failure distribution for the selected CCL type is consistent with wear-and-tear. In this example or any other example, the method further comprises, based at least in part on determining that the shape parameter β is equal to a threshold value, determining that the time-dependent failure distribution for the selected CCL type is a memoryless failure distribution consistent with random damage. In this example or any other example, the method further comprises, based at least in part on determining that the shape parameter β for the selected CCL type is less than a threshold value, determining that the time-dependent failure distribution for the selected CCL type is consistent with a relatively high rate of early component failure. In this example or any other example, the method further comprises visualizing the CCL records for the selected CCL type using at least one of a heat map, a pareto chart, or a severity chart.

In an example, a network-accessible computing system comprises: a logic subsystem; and a storage subsystem holding instructions executable by the logic subsystem to: receive, from a plurality of remote computing devices over a computer network, a plurality of unstructured aircraft component records originating from one or more different component status monitors, the plurality of unstructured aircraft component records describing observed maintenance conditions of a plurality of different aircraft components; provide the plurality of unstructured aircraft component records to a natural language processing (NLP) model configured to output a corresponding plurality of digital component, condition, and location (CCL) records for the plurality of different aircraft components; independently computer-aggregate CCL records for a plurality of different CCL types; and computer-analyze the CCL records for a selected CCL type to determine a time-dependent failure distribution for the selected CCL type. In this example or any other example, the instructions are further executable to determine visualization data indicative of a visualization for the selected CCL type, and transmit the visualization data to a client device.

In an example, a method for aircraft maintenance comprises: loading, into computer memory, a plurality of unstructured aircraft component records originating from one or more different component status monitors, the plurality of unstructured aircraft component records describing observed maintenance conditions of a plurality of different aircraft components; providing the plurality of unstructured aircraft component records from computer memory to a natural language processing (NLP) model configured to output a corresponding plurality of digital structured aircraft component records; computer aggregating structured aircraft component records for a selected aircraft component type; and computer analyzing the structured aircraft component records for the selected aircraft component type to determine a time-dependent failure distribution for the selected aircraft component type.

The invention claimed is:

1. A method for aircraft maintenance, the method comprising:
loading, into computer memory, a plurality of unstructured aircraft component records originating from one or more different component status monitors, the plurality of unstructured aircraft component records describing observed maintenance conditions of a plurality of different aircraft components, wherein the plurality of unstructured aircraft component records do not follow a predefined schema in which information is organized into two or more distinct fields;
providing the plurality of unstructured aircraft component records from computer memory to a natural language processing (NLP) model configured to output a corresponding plurality of digital component, condition, and location (CCL) records for the plurality of different aircraft components;
independently computer aggregating CCL records for a plurality of different CCL types; and
computer analyzing the CCL records for a selected CCL type to determine a time-dependent failure distribution for the selected CCL type.

2. The method of claim 1, wherein the plurality of different aircraft components are passenger-facing or crew-facing components in an interior cabin of an aircraft.

3. The method of claim 1, further comprising, utilizing the time-dependent failure distribution to at least one of determine a maintenance interval, facilitate part demand estimation, or facilitate a reliability analysis associated with the selected CCL type.

4. The method of claim 3, wherein the maintenance interval for the selected CCL type is set to reduce a predicted failure rate for the selected CCL type to below a predetermined failure risk threshold.

5. The method of claim 1, further comprising, based at least in part on the time-dependent failure distribution, identifying a remedial action to address an observed failure affecting the selected CCL type.

6. The method of claim 5, wherein the remedial action is identified based on one or both of a technical severity index derived from the CCL records for the selected CCL type, and a passenger inconvenience index derived from one or more passenger information sources.

7. The method of claim 6, wherein the one or more passenger information sources comprise one or more of passenger surveys and passenger social media posts.

8. The method of claim 1, wherein the NLP model is a convolutional neural network (CNN) previously trained via a supervised learning process in which a training set of unstructured aircraft component records are manually labeled from a predetermined menu of CCL labels.

9. The method of claim 8, further comprising retraining the NLP model via a reinforcement training process, in which an updated training set of unstructured aircraft component records are manually labeled from the predetermined menu of CCL labels.

10. The method of claim 1, wherein the one or more different component status monitors comprise at least one of a user device associated with one or more human personnel or one or more on-board aircraft sensors.

11. The method of claim 1, wherein the NLP model is configured to output the plurality of CCL records from unstructured aircraft component records that comprise free-form human-written records.

12. The method of claim 1, wherein the NLP model is configured to output the plurality of CCL records from unstructured aircraft component records that use a plurality of inconsistent descriptive terms to describe the observed maintenance conditions of the plurality of different aircraft components, the plurality of CCL records using a consistent set of descriptive terms to describe the observed maintenance conditions.

13. The method of claim 12, wherein the NLP model is configured to output equivalent CCL records from two unstructured aircraft component records that use different descriptive terms to describe a same maintenance problem with a same aircraft component of the plurality of different aircraft components.

14. The method of claim 1, wherein the NLP model is configured to output the plurality of CCL records from unstructured aircraft component records that use a plurality of different data formats to describe the observed maintenance conditions of the plurality of different aircraft components, the plurality of CCL records using a same structured data format to describe the observed maintenance conditions.

15. The method of claim 1, wherein the NLP model is configured to output the plurality of CCL records from unstructured aircraft component records that comprise Air Transport Association (ATA) codes.

16. The method of claim 1, wherein the NLP model is configured to output the plurality of CCL records from unstructured aircraft component records that originate from one or more of an aircraft logbook, aircraft maintenance records, aircraft modification records, aircraft service bulletin records, and existing aircraft maintenance schedules.

17. The method of claim 1, wherein determining the time-dependent failure distribution for the selected CCL type comprises calculating a shape parameter $\beta$ of a cumulative distribution function that fits the CCL records for the selected CCL type.

18. The method of claim 17, wherein the cumulative distribution function is a Weibull distribution.

19. The method of claim 17, further comprising, based at least in part on determining that the shape parameter $\beta$ has higher than a threshold value, determining that the time-dependent failure distribution for the selected CCL type is consistent with wear-and-tear.

20. The method of claim 17, further comprising, based at least in part on determining that the shape parameter $\beta$ is equal to a threshold value, determining that the time-dependent failure distribution for the selected CCL type is a memoryless failure distribution consistent with random damage.

21. The method of claim 17, further comprising, based at least in part on determining that the shape parameter $\beta$ for the selected CCL type is less than a threshold value, determining that the time-dependent failure distribution for the selected CCL type is consistent with a relatively high rate of early component failure.

22. The method of claim 1, further comprising visualizing the CCL records for the selected CCL type using at least one of a heat map, a pareto chart, or a severity chart.

23. A network-accessible computing system, comprising:
a logic subsystem; and
a storage subsystem holding instructions executable by the logic subsystem to:
receive, from a plurality of remote computing devices over a computer network, a plurality of unstructured aircraft component records originating from one or more different component status monitors, the plurality of unstructured aircraft component records describing observed maintenance conditions of a plurality of different aircraft components, wherein the plurality of unstructured aircraft component records do not follow a predefined schema in which information is organized into two or more distinct fields;
provide the plurality of unstructured aircraft component records to a natural language processing (NLP) model configured to output a corresponding plurality of digital component, condition, and location (CCL) records for the plurality of different aircraft components;
independently computer-aggregate CCL records for a plurality of different CCL types; and
computer-analyze the CCL records for a selected CCL type to determine a time-dependent failure distribution for the selected CCL type.

24. The network-accessible computing system of claim 23, wherein the instructions are further executable to determine visualization data indicative of a visualization for the selected CCL type, and transmit the visualization data to a client device.

25. A method for aircraft maintenance, the method comprising:
loading, into computer memory, a plurality of unstructured aircraft component records originating from one or more different component status monitors, the plurality of unstructured aircraft component records describing observed maintenance conditions of a plurality of different aircraft components, wherein the plurality of unstructured aircraft component records do not follow a predefined schema in which information is organized into two or more distinct fields;
providing the plurality of unstructured aircraft component records from computer memory to a natural language processing (NLP) model configured to output a corresponding plurality of digital structured aircraft component records;
computer aggregating structured aircraft component records for a selected aircraft component type; and
computer analyzing the structured aircraft component records for the selected aircraft component type to determine a time-dependent failure distribution for the selected aircraft component type.

* * * * *